Feb. 10, 1925.
F. BRUMFIELD
TIRE CARRIER
Filed Nov. 17, 1923
1,526,049
2 Sheets-Sheet 1
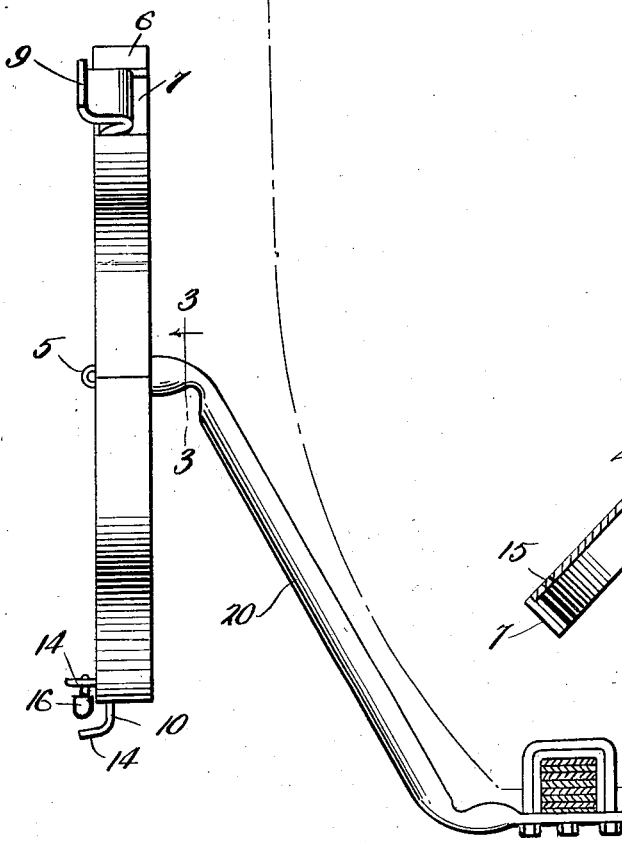
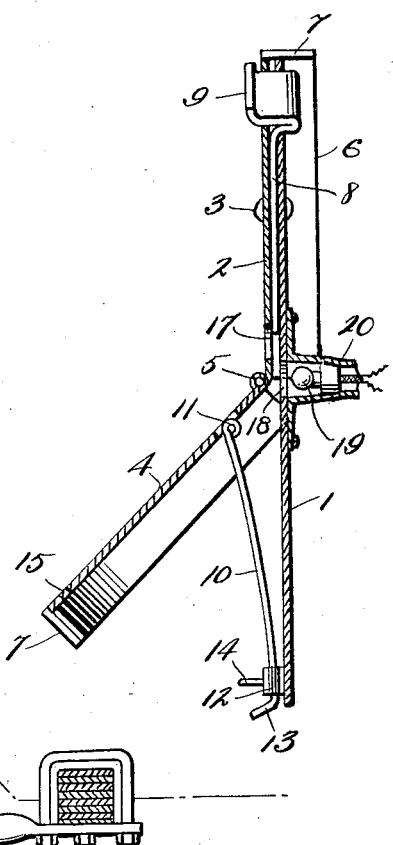
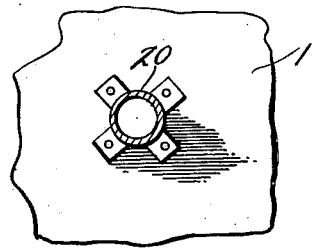
Witnesses:
Inventor
FRANK BRUMFIELD.
By Richard B. Owen
Attorney Feb. 10, 1925.                                                              1,526,049
F. BRUMFIELD
TIRE CARRIER
Filed Nov. 17, 1923          2 Sheets-Sheet 2

Inventor
FRANK BRUMFIELD.
By Richard B. Owen.
Attorney

Patented Feb. 10, 1925.

1,526,049

UNITED STATES PATENT OFFICE.

FRANK BRUMFIELD, OF BELPRE, KANSAS.

TIRE CARRIER.

Application filed November 17, 1923. Serial No. 675,374.

*To all whom it may concern:*

Be it known that I, FRANK BRUMFIELD, a citizen of the United States of America, residing at Belpre, in the county of Edwards and State of Kansas, have invented certain new and useful Improvements in Tire Carriers, of which the following is a specification.

The present invention relates to a tire carrier for use upon automobiles and is preferably positioned to the rear thereof. I have shown the device in the present disclosure of the invention associated with a bracket designed for use upon Ford automobiles but it is evident that by the use of different brackets this carrier may be used upon various different makes of automobiles.

The principal object of the invention is to provide a tire carrier having a simple and efficient construction which is reliable, comparatively inexpensive to manufacture, attractive in appearance, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is a side elevation of the carrier embodying my invention,

Figure 2 is a vertical transverse section taken therethrough,

Figure 3 is a detail section taken substantially on the line 3—3 of Figure 1,

Figure 4:
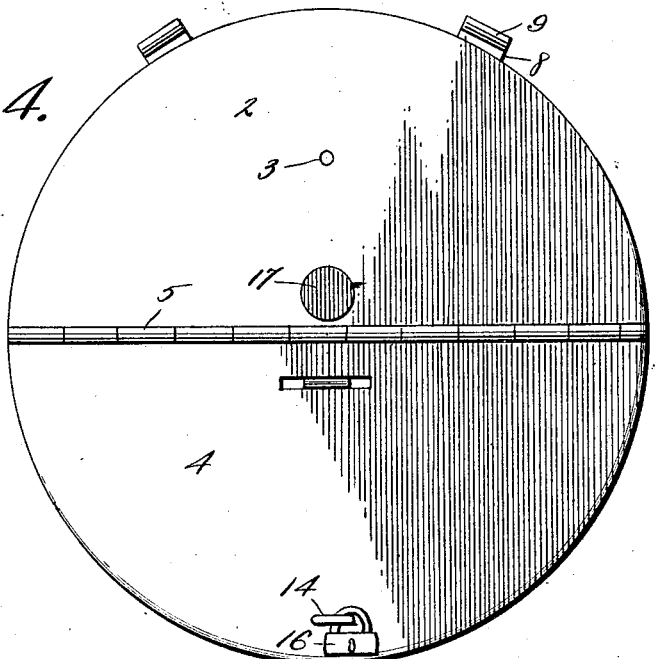
Figure 4 is a front elevation of the device in a closed position.
Figure 5:
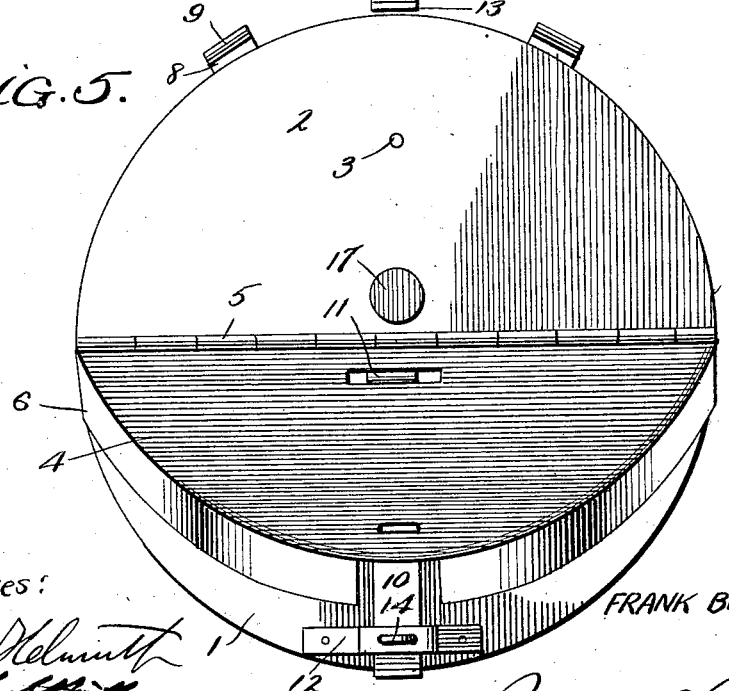
Figure 5 is a similar view of the device in an open position.

Referring to the drawing in detail, it will be seen that 1 designates the inner plate and 2 the outer plate. The outer plate 2 is formed in two sections, one of which is fixed to the plate 1 by a rivet 3 or other suitable means while the other section 4 is hinged to the fixed section as at 5. This plate 2 is provided with an annular flange 6 adapted to extend over the plate 1. The flange is provided with three slots 7 two of which are disposed adjacent the fixed section of plate 2 and one of which is disposed adjacent the movable section 4. A pair of arms 8 are suitably fixed to the plate 1 and the fixed section of plate 2 extending therebetween and penetrating two of the slots 7 in the flange 6. These arms 8 terminate in rim engaging feet 9 of any suitable structure. An arm 10 is pivoted at one end to the movable section 4 adjacent its hinged structure 5 with the fixed section as is indicated at 11. A guide member 12 is disposed at the bottom of the fixed plate for the reception of this arm 10. A rim engaging foot 13 is formed on the terminal of the arm 10 and when the section 4 is closed over the plate 1 it will be seen that this arm 10 is projected from the edge of the fixed plate 1 through the slot 7 in the rim about the section 4 thus engaging the rim with the spare tire thereon so that it will be held in firm engagement with the feet 9 of the other arms 8 and the foot 13 of the arm 10. A U-shaped shackle 14 is formed on the guide member 12 and is adapted to extend through a slot 15 provided in the section 4 when the same is closed so that a suitable padlock 16 may be engaged therewith and hold the movable section 4 adjacent to plate 1. Thus it will be seen that the tire rim cannot be removed when the parts are assembled as shown in Figures 1 and 4, but may be readily removed when the parts are moved to the position shown in Figures 2 and 5.

A ledge 17 is provided in the fixed section of the plate 2 and an opening 18 is provided in the plate 1 so that a source of illumination 19 may be provided in the rear of this opening to project its rays of light therethrough and through the lens 17 thereby acting as a tail light for the automobile. The bracket 20, which I have disclosed, is adapted to be attached to the rear spring of a Ford automobile and a source of illumination 19 may be placed in the end thereof.

Although I have described my invention with a certain degree of particularity, it is to be understood that numerous changes in the details of construction and in the combination and arrangement of parts may be resorted to without departing from the spirit of the invention as hereinafter claimed.

Having thus described my invention what I claim as new is:—

1. A tire carrier of the class described including a plate, a second plate including a fixed section and a hinged section, means for fixing the fixed section to the first plate, a pair of fixed tire rim engaging arms, and a third arm hinged to the movable section of the second plate.

2. A tire carrier of the class described including a pair of plates, one of said plates including a fixed section and a hinged section, means for fixing the fixed section of one plate to the other plate, a tire engaging arm fixed between the fixed section of one plate and the other plate, a guide member on the plate not having the sections and a tire rim engaging arm pivoted at one end to the hinged section and passing through the guide member.

3. A tire carrier of the class described including a pair of plates, one of said plates including a fixed section and a hinged section, means for fixing the fixed section of one plate to the other plate, a tire engaging arm fixed between the fixed section of one plate and the other plate, a guide member on the plate not having the sections and a tire rim engaging arm pivoted at one end to the hinged section and passing through the guide member, an annular rim provided on the edge of the plate including the sections and provided with slots for receiving said arms.

In testimony whereof I affix my signature in presence of two witnesses.

FRANK BRUMFIELD.

Witnesses:
CARL BAKER,
H. S. McCLINTICK.